United States Patent

Dolfing et al.

[15] 3,690,107
[45] Sept. 12, 1972

[54] METHOD OF IMPEDING THE GROWTH OF PLANTS ON NON-AGRICULTURAL SOILS

[72] Inventors: Thale Dolfing, Winschoten; Jan Lolkema, Hoogezand, both of Netherlands

[73] Assignee: Lolkema Scholten Honig Research N.V., Foxhol, Netherlands

[22] Filed: Sept. 9, 1970

[21] Appl. No.: 70,918

[30] Foreign Application Priority Data

Sept. 16, 1969 Great Britain..........45,480/69

[52] U.S. Cl. ......................................61/36 R, 94/25
[51] Int. Cl. ................................................E02d 3/14
[58] Field of Search .61/36 R; 47/9, DIG. 1, DIG. 10; 94/25; 21/2, 58

[56] References Cited

UNITED STATES PATENTS

| | | |
|---|---|---|
| 2,197,843 | 4/1940 | Van Leeuwen............61/36 R |
| 2,300,325 | 10/1942 | van Leeuwen............61/36 R |
| 2,329,148 | 9/1943 | van Leeuwen............61/36 R |
| 3,021,298 | 2/1962 | Rakowitz...................61/36 R |
| 3,077,054 | 2/1963 | Niemeijer..................61/36 R |
| 3,151,998 | 10/1964 | Hemwall................61/36 R X |
| 3,286,475 | 11/1966 | Adams......................61/36 R |

FOREIGN PATENTS OR APPLICATIONS

| | | |
|---|---|---|
| 626,710 | 9/1961 | Canada.................47/DIG. 10 |
| 601,558 | 7/1960 | Canada.................47/DIG. 10 |

*Primary Examiner*—Stephen J. Novosad
*Attorney*—Wenderoth, Lind & Ponack

[57] ABSTRACT

Method of impeding the growth of plants on non-agricultural soils substantially completely by incorporating into said soils and homogeneously distributing therethrough, to a depth of at least one inch, a water-soluble or water-dispersible, preferably water-insoluble, natural or synthetic high polymeric substance in an amount of between 0.03 and 0.75 weight percent of the treated soil, wetting down the soil thoroughly with water and thereafter compacting the thus treated soil while still being in a wet state to a homogeneous, coherent and dense mass.

19 Claims, No Drawings

METHOD OF IMPEDING THE GROWTH OF PLANTS ON NON-AGRICULTURAL SOILS

In U.S. Pat. No. 3,077,054 it has been proposed to check wind and water erosion of erodible soils, more particularly of cultivable soils, by treating the surface of said soils with an aqueous dispersion of water insoluble polyvinyl compounds, in a proportion corresponding to 5 to 50 grams of the dry polyvinyl compound per square meter of the soil, so as to form a film of the polyvinyl compound on the surface of said soil. In such treatment the surface of the soil is moistened down to a depth of a few millimeters and after the dispersion has dried a water-insoluble resilient crust will have formed on the surface of the soil so that an excellent and durable protection against wind and water erosion is obtained. It has been observed in the afore mentioned patent specification that the growth of plants is not at all impeded or delayed by said treatment.

We have now found that the growth of plants on non-agricultural soils can be impeded substantially completely by incorporating into said soils and homogeneously distributing therethrough, to a depth of at least one inch, preferably to a depth of 2 to 6 inches, a water-soluble or water-dispersible natural or synthetic high polymeric substance in an amount of between 0.03 and 0.75 weight percent of the treated soil, wetting down the soil thoroughly with water and thereafter compacting the thus treated soil while still being in a wet state to a homogeneous, coherent and dense mass.

More specifically, the method according to the invention is characterized by the following steps: a) loosening and crumbling the soil to a depth of at least 1 inch, preferably to a depth of 2 to 6 inches; b) homogeneously dispersing a water soluble or water dispersible natural or synthetic high polymeric substance through the loosened and crumbled layer of the soil; c) wetting down the crumbled soil thoroughly with water, either before, during or after the incorporation of the high polymeric substance, and d) compacting the treated layer of soil while still in a wet state to a homogeneous, coherent and dense mass.

The loosening and crumbling of the soil to the depth required may be effected in various ways and by techniques well known in agriculture, such as roto-tilling, plowing, harrowing and raking.

This crumbling of the top layer, i.e., the layer having a depth of at least 1 inch, preferably of 2 to 6 inches, can be best done in a period of dry weather. It is evident that the more regular and the finer the crumbs are the better and more rapidly a good mixture of the high polymeric compound with the layer to be treated will be obtained.

The thorough wetting of the loosened and crumbled layer of the soil with water may be effected either before, during or after the incorporation of the high polymeric substance in the soil depending upon whether the high polymeric substance is being added in the form of an aqueous solution or dispersion or in the form of a dry cold water soluble or cold water dispersible preparation. In the latter case the wetting usually follows the incorporation of the dry high polymeric substance, while in the first case the wetting preferably precedes the addition of the aqueous solution or dispersion of the high polymeric substance to the soil.

The intimate mixing of the high polymeric compound with layer of the soil to be treated in accordance with the invention can be effected in various ways. According to a preferred embodiment of the invention the crumbled top layer is sprayed with the required amount of an aqueous solution or dispersion of the high polymeric compound, after which the thus treated layer is densified in the wet state to a compact mass by rolling or tamping. In order to promote a good impregnation of the top layer to be treated with the high polymeric substance it is recommended to rain on the crumbled top layer in advance with a substantial amount of water before spraying on the aqueous solution or dispersion of the high polymeric substance. This previous raining is of particular importance if the high polymeric compound is sprayed in the form of an aqueous solution or dispersion of comparatively high concentration, e.g., a 20 to 30 percent concentration.

The previous raining of the crumbly top layer is less necessary and may in many cases even be omitted, if the high polymeric substance is used and sprayed in the form of a diluted solution or dispersion, e.g., in a concentration of 2 to 5 percent. If desired, crumbling of the soil and adding of the aqueous solution or dispersion of the high polymeric substance can also be combined in one operation, e.g., with the aid of a roto-tiller which is equipped with a spraying apparatus for aqueous liquids. When using a very dilute aqueous solution or dispersion of the high polymeric substance it is in this way even possible to perform steps a), b) and c) of the method according to the invention in one operation.

When the high polymeric compounds, which may be applied according to the invention, are easily redispersible in the dry state in cold water, they may be intimately mixed, if desired, in the dry state with the layer of the soil to be treated. In this case the addition of the high polymeric compound may be effected before, during or after crumbling the top layer. After a good mixture of high polymeric substance and soil has been reached the crumbly top layer is rained thoroughly with water, as a result of which the high polymeric compound rapidly redisperses or swells in the moisture present and will immediately become active and exert its cementing action on the soil. Thereafter the thus treated and still wet top layer of the soil is densified, e.g. by rolling or tamping, to form a homogeneous and coherent mass.

In order to enhance the smoothness of the surface of the soil before densifying the treated and still wet layer, it may often be desirable to spread evenly a thin layer of earth, e.g., sand, on said surface, and subsequently to spray said thin layer with a small amount of the aqueous solution or dispersion of the high polymeric substance.

The amount of high polymeric compound to be applied depends on the thickness of the top layer and the nature of the soil to be treated and generally lies within between 0.03 and 0.75 weight percent of the treated soil. In most cases, however, excellent results are already obtained with a percentage of from about 0.03 to about 0.2 percent.

According to the preferred and practically most valuable embodiment of the invention water-insoluble polyvinyl compounds capable of forming aqueous dispersions are used as the high polymeric substance.

Examples of water-insoluble polyvinyl compounds that are suitable for the present purpose are homo- and copolymers of vinyl compounds, such as vinyl esters of aliphatic acids, e.g., vinyl acetate or vinyl propionate; acrylic acid or methacrylic acid; acrylic acid esters, e.g., 2-ethylhexyl acrylate or methacrylic acid esters; acrylonitrile; vinylchloride; ethylene; butadiene and styrene. In some cases it may be desirable to add a plasticizer to the insoluble polyvinyl compound so as to increase the cementing properties of the same to the degree most useful for the purposes of the invention. With this class of high polymeric substances excellent and durable results are obtained, not only in the higher range of the aforesaid weight percentages but also in the lower one.

For the purpose of the invention also water-soluble high polymeric substances of natural or synthetic nature are suitable, such as e.g., water soluble polyacrylates and polyacrylamides and more particularly water soluble polysaccharides or water-soluble derivatives of polysaccharides.

Examples of such polysaccharides are starches, e.g., coldswelling starches, amylose and amylopectin, water-soluble ethers and esters of starches, amylose and amylopection, water soluble ethers and esters of cellulose, vegetable gums, plant slimes and microbial gums such as Xanthomonas gum. In general the water-soluble ethers and esters of said polysaccharides are preferred because these derivatives not only possess the advantage of being usually better soluble in water than the non-derivatized polysaccharides, but are also more resistant to biological degradation by the microorganisms of the soil. The stability in the soil of water soluble ethers and esters of the aforesaid polysaccharides for many purposes is satisfactory if they contain at least about 0.7 ether or ester group per structure unit of the polysaccharide molecule. Preferably, however, products are used which contain at least on an average one ether and/or ester group per structure unit, for it has appeared that such ethers and esters are not, or practically not, decomposed by the microorganisms in the soil. Generally they will be less attacked with an increasing number of ether of ester groups per structure unit. The term "structure unit" refers to the simple monosaccharide molecules of which the polysaccharide is composed.

According to an important embodiment of the invention water-soluble or water-dispersible starch ethers are used with which very favorable results are obtained. Examples of suitable ethers of starch are water soluble hydroxyethyl- and hydroxypropylethers, water-soluble carboxymethylethers, water-soluble or water-dispersible benzylethers and mixed ethers such as water-soluble hydroxyethyl carboxymethyl ethers and hydroxyethyl benzylethers of starch. Particularly suitable for the present purpose are the cold-water soluble or cold-water swelling starch ethers obtained according to British Patent specification No. 601.374. They are not only cheap as a result of the simple manufacturing process, but they also offer the important advantage that they consist of porous, more or less spongy, flakes, which owing to this structure will completely and readily dissolve or swell in cold water. Very good results are also obtained with combinations of water insoluble and water soluble high polymeric substances, particularly with mixtures of water-insoluble polyvinyl compounds and water-soluble starch ethers. In this case the weight ratio of both components of the mixture may vary between wide limits. Such mixtures can be prepared by adding an aqueous solution of the starch ether to an aqueous dispersion of the insoluble polyvinyl compound. It is also possible to stir dry preparations containing both the water-insoluble polyvinyl compound and the water-soluble starch ether with cold or warm water to form a diluted dispersion. Such dry preparations may be obtained by simply mixing powdery water-dispersible polyvinyl compounds and dry water-soluble starch ethers, but they may also be prepared by simultaneously drying the soluble starch ether and an aqueous dispersion of the polyvinyl compound, e.g., by drying on heated drums. In the latter case dry cold-water dispersible preparations are obtained, which may be incorporated into the soil to be treated, either in the dry form or in the form of an aqueous dispersion.

For the purpose of the invention other suitable products are water soluble of water-dispersible starch vinyl graft copolymers, e.g., starch-polyacrylonitrile, starch-poly(methyl methacrylate), and starch-poly(methyl-acrylate) graft copolymers.

The method according to the invention may be applied on divergent kinds of soil, such as clay and sand soils and soils consisting of mixtures of clay and sand.

It is very surprising that through the application of the process according to the invention it is possible, with the aid of comparatively small percentages of said high polymeric substances, to prevent vegetation on these soils without the addition of other auxiliaries, such as herbicides. The duration of this prevention depends on the nature and the percentage of the high polymeric substance applied as well as on the nature of the treated soil and may vary from several months to some years. If desired one may add to the aqueous solution or dispersion of the high polymeric substance or to the water which may be used to rain the soil various substances, such as e.g., insecticides, fungicides, rodenticides, dyestuffs and pigments. By a suitable choice of dyestuffs and/or pigments it is possible to give the soil of dikes, slopes etc. treated in accordance with the invention a certain color, e.g., an attractive green color. In some cases it may be useful to add to the aqueous solution or dispersion of the high polymeric substance a small proportion of a herbicide, e.g., to kill any plant vegetation already present in the soil.

The process according to the invention is of great importance for various purposes. One of the most important applications is the prevention of vegetation on the dikes, which are arranged around storage depots of combustible liquids for safety purposes, such as those around large oil tanks in harbor areas and near oil refineries. Due to the great fire risk the vegetation on these dikes is subjected to severe prescriptions and especially the grass has to be cut short continuously by repeated mowing, so that no hayformation will occur. The maintenance and supervision of said dikes are logically accompanied by large expenses. Practical trials have proved that by the application of the method according to the invention the vegetation on these protective dikes can be prevented efficiently, meaning that not only the safety is promoted but that also the cost of maintenance is reduced considerably.

Other applications for which the method according to the invention equally offers a relief are, amongst others, the verges and the slopes of the large highways and the steep sides of ditches and drainage canals, where the regular removal of grass and weeds also constitutes an ever greater problem by the high expenses for wages. The same applies to banks, embankments, temporary roads, building sites, etc.

If desirable, the slopes of dikes, roads, rail embankments etc. may also be treated, during or after the treatment in accordance with the process of the invention, with an aqueous solution or dispersion of a water repellent agent, e.g., on the bases of paraffin, silicone oil or a polyurethane polymer. This treatment is preferably effected after the incorporation of the high polymeric substance on the still humid layer, whether or not already compressed.

If it is desirable or necessary that the top layer of the soil treated according to the invention should be resistant against the penetration of organic chemicals such as oils, e.g., in the case of the protecting dikes surrounding large oil tanks, the surface of said top layer may be covered, preferably in the dry state, with a polyurethane, polyester, polyepoxy or polyacrylate polymer. This may be accomplished e.g., by spraying into said surface an one-shot formulation for producing a non-cellular polyurethane coating. Excellent results are obtained by using as the polyol component of the said one-shot formulation an acid catalyzed polyolether with a hydroxyl number within the range of between 150 and 350 as claimed and described in British Patent specification 1.016.589. If desired the formulation may contain finely divided glass or polyester particles as reinforcing agents.

The present invention will be further illustrated by the following specific examples.

EXAMPLE I

This example relates to the treatment according to the invention of a protecting dike which surrounds a large oil tank.

The upper layer of a recently built and profiled enclosing dike for a large oil tank, which has not yet been provided with a turf, is opened by raking it mechanically to a depth of approx. 8 – 12 cms, preferably in dry weather. Raking and harrowing is continued until the layer of 8 – 12 cms has assumed a uniform, crumbly structure.

The layer is successively sprayed with water in a quantity of 500 – 1,000 mls/m$^2$ and immediately thereafter with a 20 percent aqueous dispersion of polyvinylacetate, containing 10 percent of dibutylphtalate, calculated on the solids.

The dispersion is applied in a quantity of 500 mls of liquid per m$^2$, corresponding with about 0.06 weight percent of the treated soil. The layer treated in this way is compressed in its wet state with the aid of a heavy roller to form a compact, homogeneous mass. In the course of a periodical check of the enclosing dike treated according to the invention it is established that after a period of 7 months hardly any vegetation has developed and that the dike body is excellently resistant to the influences of weather and wind.

Equally good results are obtained with enclosing dikes of oil tanks already grown over with grass by first killing the grass with the aid of a herbicide, such as gramoxone, then freeing the dikes carefully from grass and roots and subjecting them to the above treatment.

EXAMPLE II

The upper layer of a newly built and profiled dike around a large oil tank and of the horizontal part of the enclosed tank pit are raked and sprayed with water as described in Example I. The humid top layer of the dike and of the bottom of the pit is sprayed with a 20 percent dispersion of a copolymer of 80 parts by weight of vinyl acetate and 20 parts by weight of 2-ethylhexyl acrylate in a quantity of 500 mls of liquid per m$^2$. The humid top layer of the dike and the bottom of the pit is compressed in the wet state, by means of a heavy roller, to form a compact, homogeneous mass.

After the compacted top layer of the dike and pit has become dry, it is sprayed with a one-shot polyurethane forming formulation, consisting of a mixture of crude methylene diphenyl diisocyanate as the isocyanate component, hydroxypropylated dextrose containing secondary and primary hydroxyl groups having an hydroxyl number of 250 as the polyol component and vanadium oxyisopropylate as a catalyst for the urethane forming reaction. In this way the top layer of the dike and pit is covered with a polyurethane layer of about 1 mm.

The compacted and aftertreated dike and bottom of the tank pit are exceptionally stable against the penetration of oil, whereas at the same time the stability of the top layer under strongly varying weather conditions is extremely good.

EXAMPLE III

The procedure described in Example I is used, but instead of using the polyvinyl acetate dispersion containing dibutyl phtalate, the humid layer of the enclosing dike is sprayed with a 10 percent aqueous solution of a homopolymer of vinyl propionate in a quantity of 1,200 mls of liquid per m$^2$, corresponding with about 0.07 weight percent of the treated soil. The results obtained are practically identical to those described in Example I.

EXAMPLE IV

The procedure is similar to that of Example I, but instead of using the polyvinyl acetate dispersion the humid layer of the enclosing dike is sprayed with an 8 percent aqueous dispersion of a cold water soluble hydroxyethyl ether of starch with an average degree of substitution of 1,4 hydroxyethyl groups per glucose unit in a quantity of 1 liter of liquid per m$^2$, corresponding with approximately 0.05 weight percent of the treated soil. The results obtained are practically identical to those described in Example I.

EXAMPLE V

A procedure similar to that of Example I is used, but now the humid layer of the enclosing dike is sprayed with a 10 percent aqueous dispersion of a copolymer of 80 parts by weight of vinyl acetate and 20 parts by weight of 2-ethylhexylacrylate, the water phase of which contains 100 grams per liter of the ammonium salt of a copolymer of 85 parts by weight of vinyl acetate, 10 parts by weight of 2-ethylhexylacrylate and 5 parts by weight of acrylic acid, in a quantity of 1,200 mls of liquid per m². This quantity corresponds with approximately 0.05 weight percent of the treated soil. After spraying the layer, still being humid, is compressed to form a compact, homogeneous mass. A periodical check of 9 months shows that the enclosing dike treated in this way does not show any appreciable vegetation and is efficiently resistant to divergent weather conditions.

EXAMPLE VI

The procedure of Example I is used, but instead of using the polyvinyl acetate dispersion alone, the wetted layer of the enclosing dike is sprayed with a 10 percent aqueous dispersion of a plasticized polyvinyl acetate the water phase of which contains 20 grams per liter of a water-soluble hydroxypropyl ether of starch with an average degree of substitution of 1,2 hydroxypropyl groups per glucose unit. This dispersion is applied in a quantity of 700 mls of liquid per m², which corresponds with about 0.05 weight percent of the treated soil. The results obtained are practically identical to those described in Example I.

EXAMPLE VII

This example is related to a treatment, in accordance with the invention, of the middle verge of a four-lane motor road with the aid of a mixture of a water-insoluble polyvinyl compound and a water-soluble polyvinyl compound.

After a period of dry weather the middle verge of a four-lane motor road is carefully freed from the grass and weeds, after which the ground is opened by raking in a layer of about 6 cms deep. Raking is continued until the layer has assumed a uniform crumbly structure.

Subsequently the layer is first rained on with water in a quantity of 600 mls/m² and immediately thereupon sprayed with a 10 percent aqueous dispersion of a water-insoluble polyvinyl compound, the aqueous phase of which contains 100 grams per liter of a water-soluble polyvinyl compound. The mixture of both polyvinyl compounds is applied in a quantity of 800 mls of liquid per m², corresponding with approximately 0.15 weight percent of the treated soil. The crumbly layer treated in this way is compressed in the wet state by means of an iron roller to form a compact, homogeneous mass. In the course of a periodical check it is established that the middle verge treated in this way does not show any appreciable vegetation after 8 months and that the resulting layer is perfectly resistant to influences of weather and wind.

The water-insoluble polyvinyl compound applied in this example is a copolymer obtained by emulsion polymerization of 80 parts by weight of vinyl acetate and 20 parts by weight of 2-ethylhexylacrylate, while the water-soluble polyvinyl compound applied is the sodium salt of a terpolymer of vinyl acetate, 2-ethylhexylacrylate and acrylic acid, prepared by emulsion polymerization of 85 parts by weight of vinyl acetate, 10 parts by weight of 2-ethylhexylacrylate and 5 parts by weight of acrylic acid followed by conversion of the resulting polymer into the water soluble sodium salt by means of neutralization with caustic soda lye.

EXAMPLE VIII

This example demonstrates the treatment, according to the invention, of the steep slopes of newly dug draining ditches and canals in a reclamation area.

By means of a mechanical rake the steep slopes of the draining ditches or canals are treated to a layer depth of about 8 cms until this layer has been raked into uniform, small granules. The resulting granular layer is subsequently sprayed first with water in a quantity of 800 mls/m² and then with a 15 percent aqueous dispersion of a plasticized polyvinyl acetate, the water phase of which contains 50 grams per liter of a cold water soluble hydroxypropylether of starch with an average degree of substitution of 1,2 hydroxypropyl groups per glucose unit. This dispersion is applied in a quantity of 800 mls/m² as well, corresponding with about 0.12 weight percent of the treated soil. Immediately after spraying the layer, which is still damp, is compressed to a compact, homogeneous mass by means of a heavy roller.

After a regular check during 6 months the ditch and canal slopes treated in this way do not show any vegetation and they exhibit good resistance to weather influences.

We claim:

1. A method of impeding the growth of plants on non-agricultural soils which comprises incorporating in said soils and homogeneously distributing therethrough to a depth of at least 1 inch a water-insoluble high polymeric substance capable of forming aqueous dispersion in an amount of between 0.03 and 0.75 weight percent of the treated soil, wetting down the soil thoroughly with water and thereafter compacting the thus treated soil while still being in a wet state to a homogeneous, coherent and dense mass.

2. A method according to claim 1 comprising:
   a. loosening and crumbling the soil to a depth of at least 1 inch.
   b. homogeneously dispensing a water-insoluble synthetic or derivatized natural high polymeric substance capable of forming aqueous dispersions through the loosened and crumbled layer of the soil,
   c. wetting down the crumbled soil thoroughly with water, either before, during or after the incorporation of the high polymeric substance and
   d. compacting the treated layer of soil while still in a wet state to a homogeneous, coherent and dense mass.

3. A method according to claim 2 in which steps a), b) and c) are performed in one operation with the aid of a roto-tiller which is equipped with a spraying apparatus for aqueous liquids.

4. A method according to claim 1 in which the soil is wetted beforehand and the high polymeric substance is incorporated in the soil by addition in the form of an aqueous dispersion.

5. A method according to claim 1 in which the high polymeric substance is incorporated in the soil in the form of a dry preparation capable of dispersion in cold water followed by wetting down the soil.

6. A method according to claim 1 in which the high polymeric substance is incorporated in said soil by spraying of an aqueous dispersion of the high polymeric substance on the top layer of the soil.

7. A method according to claim 5 in which the high polymeric substance is sprayed on in the form of a diluted aqueous dispersion, having a concentration of about 2 percent to about 5 percent by weight.

8. A method according to claim 5 in which a substantial amount of water is rained on the top layer of the soil, whereupon the high polymeric substance is sprayed on in the form of a comparatively concentrated aqueous dispersion, having a concentration of about 20 percent to about 30 percent by weight.

9. A method according to claim 1 in which the high polymeric substance is a water-insoluble polyvinyl compound capable of forming aqueous dispersions.

10. A method according to claim 9 in which the water-insoluble polyvinyl compound is a homopolymer or a copolymer of a vinyl ester of an aliphatic acid in the form of an aqueous dispersion.

11. A method according to claim 1 in which the high polymeric water-insoluble substance is used in conjunction with a water-soluble synthetic high polymer.

12. A method according to claim 11 in which the high polymeric substance consists of a mixture of a water-insoluble polyvinyl compound capable of forming aqueous dispersions and a water-soluble natural or synthetic high polymer.

13. A method according to claim 1 in which the high polymeric substance is a water-dispersible polysaccharide derivative.

14. A method according to claim 13 in which the high polymeric substance is a water-dispersible polysaccharide benzyl ether.

15. A method according to claim 13 in which the high polymeric substance is a water-dispersible starch ether.

16. A method according to claim 13 in which the high polymeric substance is a water-dispersible starch-vinyl graft copolymer.

17. A method according to claim 1 in which the surface of the top layer of the soil treated with the high polymeric substance is after compacting covered with a polyurethane, polyester, polyepoxy or polyacrylate polymer.

18. A method according to claim 1 in which the non-agricultural soil is a dike arranged around storage depots of combustible liquids.

19. A method according to claim 1 in which the high polymeric substance is homogeneously distributed through the soil to a depth of 2 to 6 inches.

* * * * *

UNITED STATES PATENT OFFICE
CERTIFICATE OF CORRECTION

Patent No. 3,690,107              Dated September 12, 1972

Inventor(s) Thale DOLFING and Jan LOLKEMA

It is certified that error appears in the above-identified patent and that said Letters Patent are hereby corrected as shown below:

Page one, first column, the names of the assignees should correctly read: -- Thale Dolfing and Scholten-Honig Research N.V., --.

Signed and sealed this 13th day of November 1973.

(SEAL)
Attest:

EDWARD M. FLETCHER, JR.           RENE D. TEGTMEYER
Attesting Officer                 Acting Commissioner of Patents